Feb. 17, 1953 — F. H. MUELLER — 2,628,454
FLUID PRESSURE REGULATOR
Filed Jan. 23, 1946 — 4 Sheets-Sheet 1
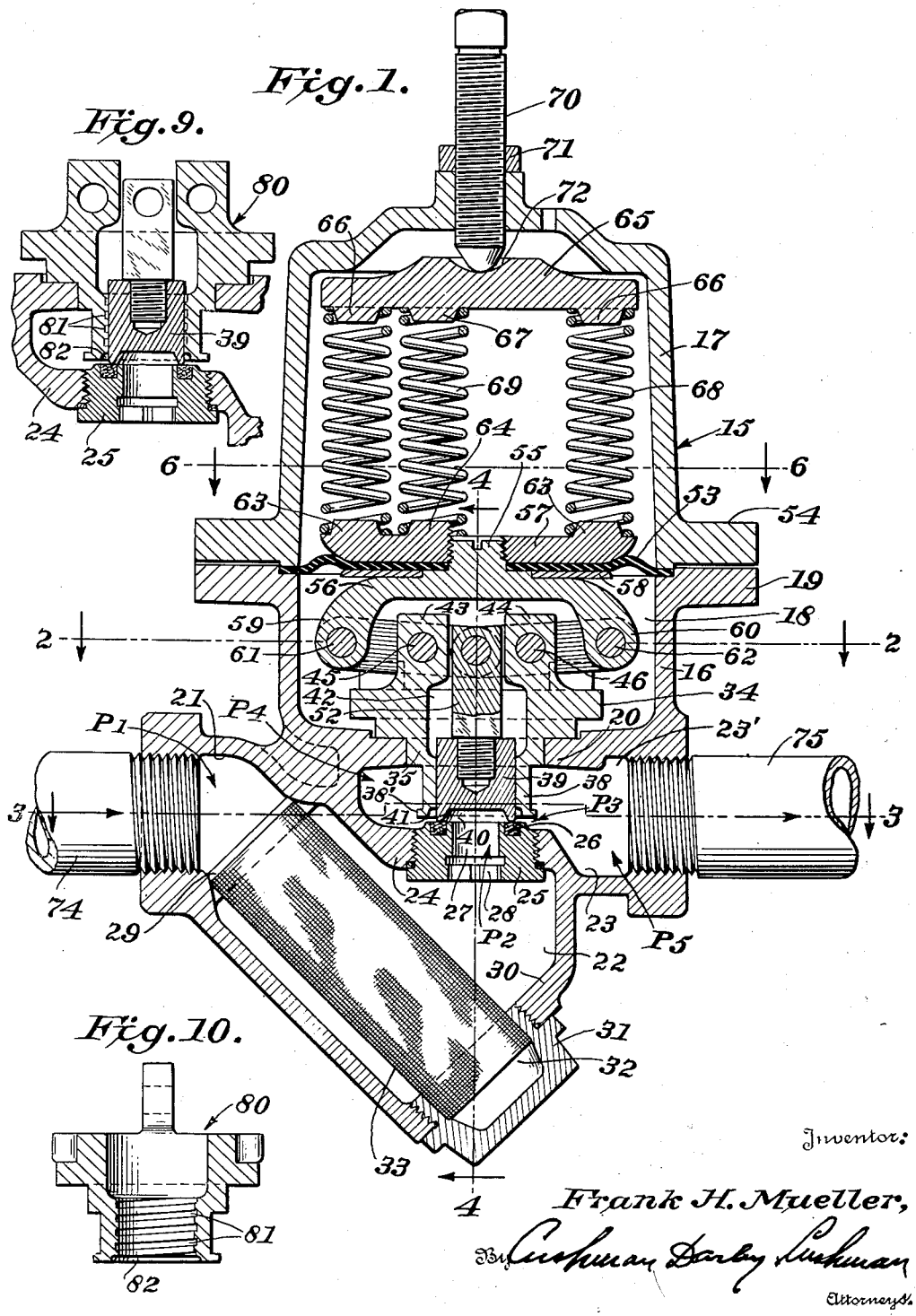
Inventor:
Frank H. Mueller,
By Cushman Darby Cushman
Attorneys Feb. 17, 1953 F. H. MUELLER 2,628,454
FLUID PRESSURE REGULATOR
Filed Jan. 23, 1946 4 Sheets-Sheet 2
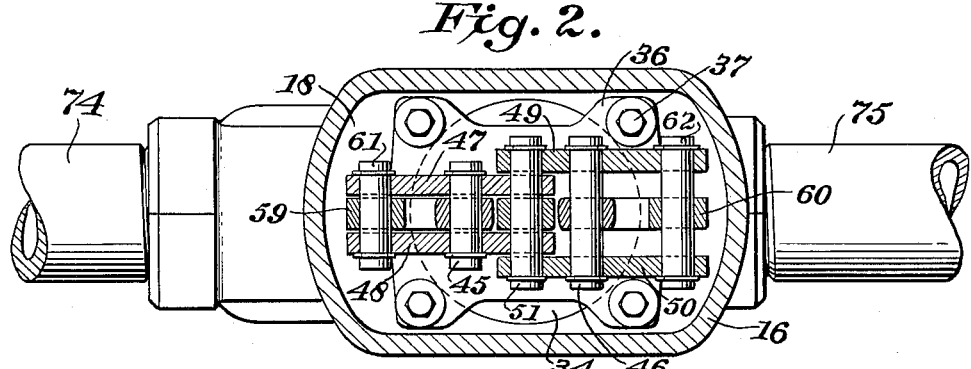
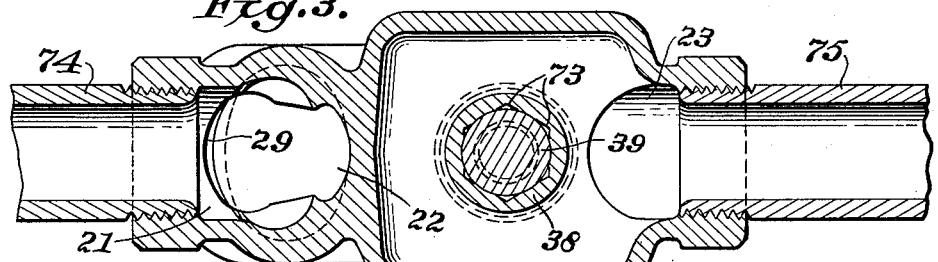
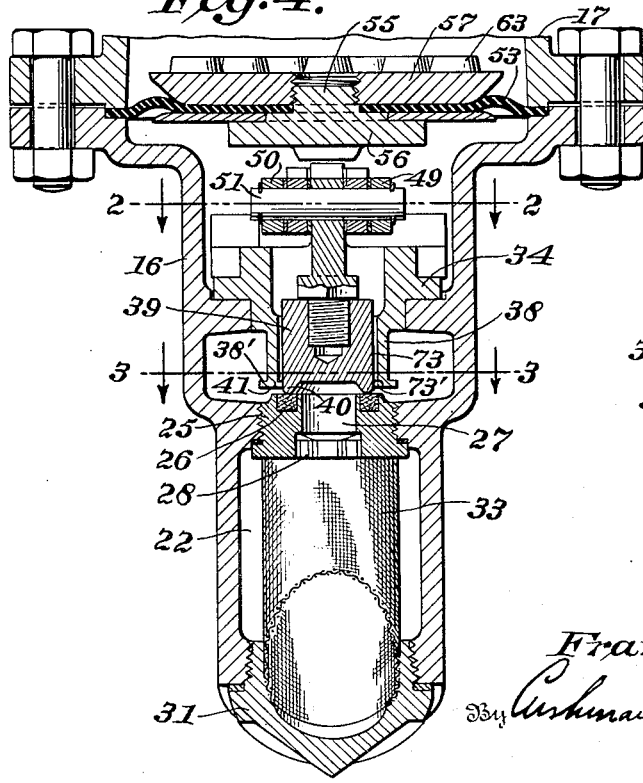
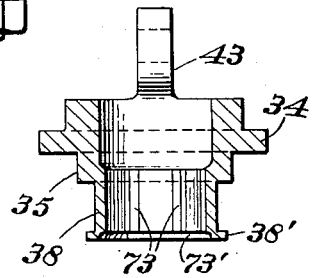
Inventor:
Frank H. Mueller,
By Cushman Darby Cushman
Attorneys.

Feb. 17, 1953 F. H. MUELLER 2,628,454
FLUID PRESSURE REGULATOR
Filed Jan. 23, 1946 4 Sheets-Sheet 3

Inventor:
Frank H. Mueller,
By Cushman Darby Cushman
Attorneys.

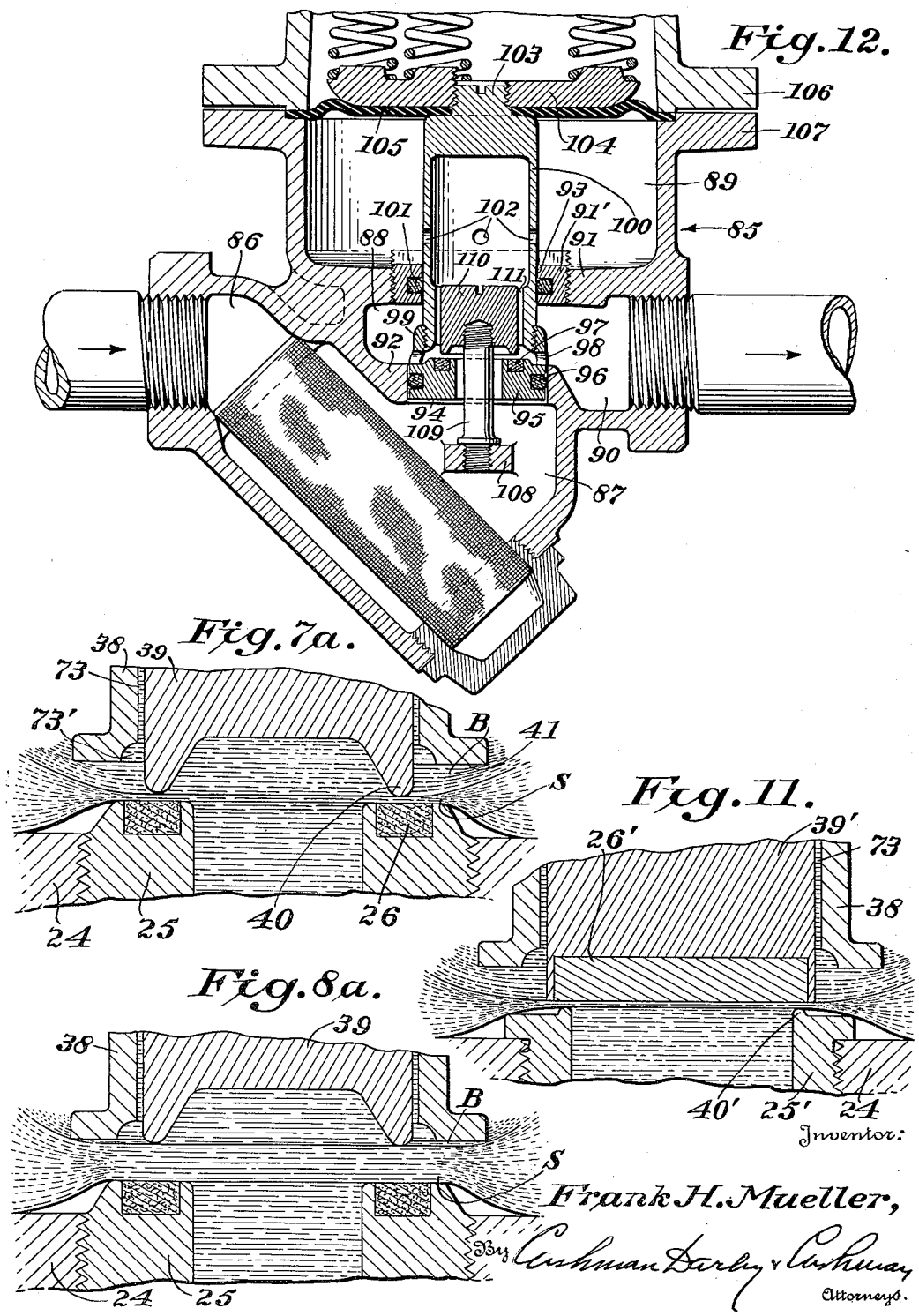

Patented Feb. 17, 1953

2,628,454

UNITED STATES PATENT OFFICE 2,628,454

FLUID PRESSURE REGULATOR

Frank H. Mueller, Decatur, Ill., assignor to Mueller Co., Decatur, Ill., a corporation of Illinois Application January 23, 1946, Serial No. 642,817

37 Claims. (Cl. 50—26)

1

The primary function of a fluid pressure reducing and regulating valve, usually called a pressure regulator, is to reduce a relatively high initial fluid pressure to a lower delivery pressure, and to maintain the delivery pressure as near as possible to the maximum for which the regulator is set, during various conditions of fluid delivery or usage.

The valve of any usual type of fluid pressure regulator is connected to, and its action consequently controlled by movement of, a movable wall, diaphragm or piston, which is impelled in one direction by means of an adjustable loading spring, tending to open the valve, and in the other direction by reaction of the delivery pressure of the fluid, tending to close the valve. The regulator is set to a predetermined maximum delivery pressure by adjusting the force of the loading spring, so that when the pressure on the outlet side of the valve reaches the maximum for which the regulator is set, the valve will be positively closed by the diaphragm moving in response to the delivery pressure.

When flow is first started through the valve, as by the opening of a faucet on the delivery side, there is an immediate drop of the pressure to a point somewhere below the maximum, called the "lock-off" pressure. Under conditions of fluid usage or flow through the usual types of pressure regulators, the delivery pressure will take a further drop to some point below "lock-off" depending generally on the volume of usage or flow, and the difference between the initial pressure and the set delivery pressure, usually called the pressure differential. That is, the greater the volume of delivery flow, the lower the delivery pressure will drop, but the drop in pressure will be less on a higher pressure differential, of for example, 75 lbs. initial to 25 lbs. per square inch delivery pressure, than on a lower differential, as from 75 lbs. initial to 50 lbs. delivery, this being true only for the same flow.

In the use of water, gas, steam, air, or other fluids normally conducted under relatively high initial pressure, the failure of a pressure regulator to maintain the delivery pressure within relatively close limits below lock-off will render the regulator impractical for most installations in which such a valve is required.

The delivery pressure of fluid may be boosted during peak usage conditions by placing a restricted orifice in the delivery conduit of the regulator, thus increasing the velocity and consequently greatly reducing the pressure at that point, and controlling the diaphragm by the reduced pressure at this orifice through a communicating passage extending from the restricted orifice into the diaphragm chamber. As the volume of delivery increases, the velocity of flow through the restricted orifice also increases and thus lowers the pressure, under the diaphragm (or piston). This permits the loading spring to force the valve to a wider opening, which increases the percentage of recovery of the pressure of the fluid ahead of the restricted orifice.

Such a device, however, has the serious disadvantage that to be effective in boosting the pressure during peak usage conditions, and at the same time precluding increase of delivery pressure above the set maximum, the restricted orifice must be designed to a specific size to work properly under a certain pressure differential, and if the same regulator be set to operate on a greater differential than that for which the orifice was designed, or the initial pressure in a fluid distribution system is temporarily increased, as, for example, in a city water system in event of a fire alarm, the delivery pressure will automatically increase to some point above the set maximum depending on the increase in the pressure differential.

For example, assuming that a ¾" size water pressure regulator, as described above, has a ⅜" orifice, which would be approximately the correct size to reduce from an initial pressure of 75 pounds per square inch to a maximum delivery pressure of 50 pounds per square inch, thus having a differential of 25 pounds per square inch, and delivery volume of 17 gallons per minute, such a regulator will recover the pressure lost in the lock-off and will then function with a constant delivery pressure substantially equal to the set delivery pressure in delivering capacity volume—in the example 17 gallons of water per minute. In a ¾" regulator having a fixed orifice, the valve will lift approximately .05" from its seat in delivering 17 gallons per minute and this will remain substantially constant irrespective of the pressure differential. Therefore, if the same regulator having the same size orifice, for example, be set to reduce from 75 pounds to 25 pounds per square inch, or if the initial pressure increases for any reason, the delivery pressure will automatically increase during delivery of the required volume of 17 gallons per minute, to a point far above the set delivery pressure. If the differential be decreased for example, to 12 pounds per square inch the delivery pressure will correspondingly drop below the set delivery pressure during delivery of the required 17 gallons per minute. The differential may be decreased, for example, by excessive use of fluid from a lateral supply line which lowers the initial pressure in the entire distribution system.

From the foregoing explanation, which is based upon accurate tests, it will be obvious that a regulator having a fixed restricted orifice in its delivery conduit must be designed for a specific pressure differential to deliver a certain volume of fluid under a predetermined delivery pressure. To use the same regulator on higher differentials would be extremely dangerous in systems carrying very high initial pressures. It is impossible to design a standardized regulator in any size having a fixed restricted orifice which will be satisfactory for use on higher or lower pressure differentials than that for which it is designed. This not only renders such a design special and more expensive to manufacture, but also greatly increases the stock required to be maintained by dealers and users of such regulators to enable them to furnish pressure regulators suitable for various pressure conditions.

The most ideal performance of a pressure regulator would be to maintain the delivery pressure at a minimum substantially equal to that for which the regulator is set when delivering desired capacity volume for the particular size regulator, irrespective of the pressure differential for which it is set, or of variations in the initial pressure. For example, it should perform equally as well when reducing pressure from 75 pounds per square inch initial pressure to 50 pounds per square inch delivery pressure, as when reducing such initial pressure to 25 pounds per square inch or lower, or vice versa. Its construction should be such as to preclude the possibility of the delivery pressure rising above the maximum for which the regulator is set at capacity flow.

Such a regulator would have several distinct advantages over any previous types, among them being the following:

1. The only setting or adjusting necessary would be to set the regulator for the desired delivery pressure, which can be done by any skilled workman such as a plumber.

2. A plumber could be having on hand one regulator of each size, for which he may have demand among his customers, be prepared to install or replace regulators under any pressure condition, and be certain that the valve would operate safely and satisfactorily.

3. A jobber or other dealer would be required to carry only a few regulators of various sizes in stock to enable him to furnish a regulator for any pressure condition.

4. The cost of manufacture would be considerably less by reason of the fact that it would be necessary to make only one size regulator to accommodate all pressure conditions, instead of making one size of special construction for each of several narrow ranges of pressure differentials.

I have designed a fluid pressure regulator in which the action of the diaphragm, or equivalent element, is controlled by a varied blend of the low seat flow pressure and the recovered pressure. The general operation of this regulator is similar to one having a restricted orifice in the delivery conduit except for one extremely important difference. This difference is that in my valve the delivery pressure will not rise above the maximum set delivery pressure at capacity flow for the reason that the variable movement of the valve provides automatic compensation of the regulating elements necessary to adapt a single regulator to a wide range of pressure differentials. A pressure regulator of this construction will maintain a set maximum delivery pressure equally as well when reducing pressure from 75 pounds per square inch initial pressure to 50 pounds per square inch delivery pressure, as when reducing such initial pressure to 25 pounds per square inch or lower, or vice versa. The reason for this is that on the higher differential the percentage of valve opening or lift, will be lower, with proportionately lower percentage of pressure recovery. With a lower pressure differential the percentage of valve opening will be higher, with proportionately higher percentage of pressure recovery so that the actual recovered pressure will tend to remain a constant. This is the effect of the automatic compensation feature referred to above.

As explained before, when a fixed orifice regulator is used, on a higher differential than that for which the orifice was designed, the valve lift will be the same when delivering the same volume, but the delivery pressure will increase to some point considerably above the set delivery pressure. Therefore, the only possible way to preclude increase of the delivery pressure of high differentials is to further restrict the valve opening, and thus cause a greater friction loss of fluid energy in flowing through the valve.

In the accompanying drawings I have shown in typical embodiment a regulator in accordance with the invention, the disclosed regulator embodying the features above discussed and also additional structural features of great advantage.

In the drawings,

Figure 1 is a vertical axial section of the new regulator,

Figure 2 is a section substantially on line 2—2 of Figure 1 and Figure 4,

Figure 3 is a section substantially on line 3—3 of Figure 1 and Figure 4,

Figure 4 is a section substantially on line 4—4 of Figure 1,

Figure 6:
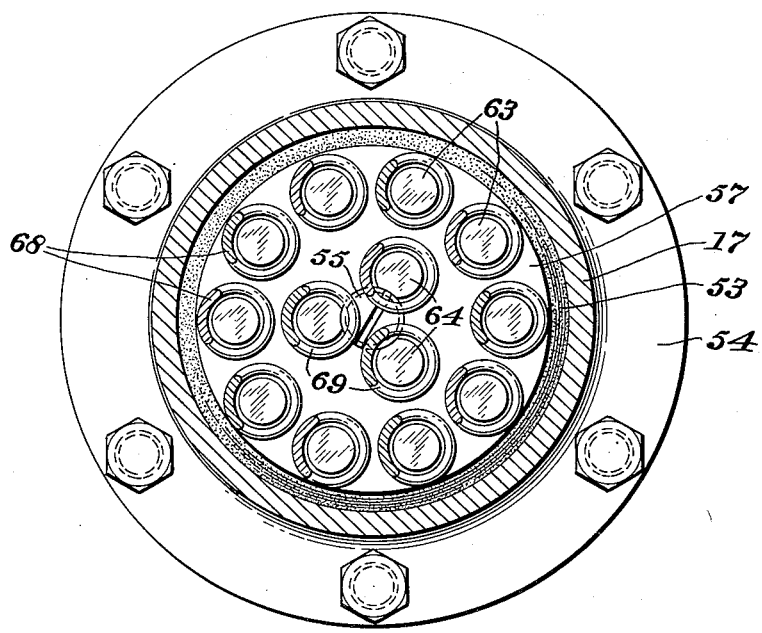
Figure 7:
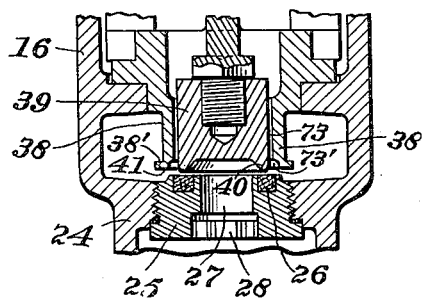
Figure 8:
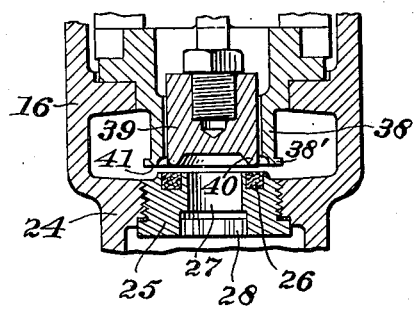

Figure 5 shows in axial section a valve guide block which appears in the preceding figures, Figure 6 is a section substantially on line 6—6 of Figure 1, Figures 7 and 8 show in different relationships parts which appear in Figure 1, Figures 7a and 8a are enlargements of portions of Figures 7 and 8 illustrating the nature of the flow in the different relationships of the parts, Figure 9 is a partial section like that of Figure 1 but showing a modified element, Figure 10 is an axial section of the modified element of Figure 9, Figure 11 is a view like that of Figure 7a, showing a modification, and Figure 12 is a partial vertical axial section of a modified form of regulator.

Referring to the drawings, and first to Figures 1 to 8a, reference numeral 15 designates generally the body of the regulator, the body preferably comprising but two main parts, namely a base portion 16 and a cap portion 17. Portion 16 defines a pressure chamber 18 which is generally oblong in section, as seen in Figure 2, and merges upwardly into a circular flange 19. In Figure 1 the regulator is shown in normal position of installation and directional references herein assume this disposition but without any intended limitation. The bottom of chamber 18 is defined in part by a fixed horizontal wall 20.

Reference numeral 21 designates an inlet port leading to an inlet chamber 22 which is separated from a recovery and outlet chamber 23 by a wall 24 spaced below wall 20. The outlet chamber 23 has an outlet port 23' which is aligned with the inlet port 21, as here shown. Threaded in and sealing with an opening in wall 24 is a nipple 25 whose inner end projects within the outlet chamber as a valve seat and is concentrically channeled to receive an annular valve gasket 26. The opening 27 of the nipple 25 constitutes an inlet port to the outlet chamber from the inlet chamber and the lower end 28 of the passage 27 is polygonal for engagement by a suitable tool for the insertion and removal of the nipple. The inlet port has a downward bend to a shoulder 29 which is directed downwardly at an angle toward a bounding wall portion 30 of the inlet chamber, which wall portion is below the nipple 25. Threaded in an opening in wall portion 30 is a plug 31 having a socket 32 in which is engaged one end of a cylindrical strainer 33 whose other end peripherally engages the shoulder 29 so that the strainer receives the entire flow from the inlet port. When plug 31 is removed the strainer is removed with it. The opening in wall 30 is sufficiently large so that nipple 25 can be inserted therethrough on a thin shanked tool and then threaded to position. The removal of the single plug 30 thus brings out the strainer and renders the valve seat nipple accessible for removal and replacement if necessary. Inasmuch as it is necessary to remove the strainer in order to render the nipple accessible the strainer is necessarily made subject to inspection, an operation heretofore usually neglected, and cleaning or replacement.

Reference numeral 34 designates a valve guide block having a reduced circular portion 35 set in an opening in wall 20 coaxial with the valve seat 25. As shown in Figure 2 the block has four wings, as at 36, above the bottom of chamber 18 through which the block is secured to the chamber bottom by screws as at 37.

Reference numeral 38 designates an extension of block 34 in the recovery chamber, the extension being provided with a bore coaxial with seat 25 and so constituting a tubular guide or neck in which is guided a cylindrical valve or body member 39, the latter being recessed at its lower end to provide a circular edge or rim 40 for engagement with the seat gasket 26, the bottom of this rim being arcuate in radial section so as to provide for line contact with the seat gasket. The neck 38 terminates downwardly in a flat annular face 41 which is parallel with the top surface of the seat and is closely adjacent thereto. The width of face 41 is here shown as enhanced by the provision of an annular radial flange 38' at the lower end of the neck since it has been found desirable to have a flat surface extending some distance beyond the edge of the seat opening to deflect the flow therefrom.

Upwardly the guide bore runs into a clearance chamber 42 above and at the sides of which block 34 is provided with diametrically opposed upright lugs 43 and 44 which are provided with parallel horizontal bores equally spaced from the valve axis, these bores receiving pivot pins 45 and 46 respectively. Pivot pin 45 carries a pair of levers 47 and 48 while pin 46 carries an equal pair of levers 49 and 50 lying outwardly of the planes of levers 47 and 48 as particularly shown in Figure 2. The adjacent lever ends all engage a pin 51 whose central portion is engaged in an opening in the upper end of a shank member 52 which is threaded into the upper end of valve 39 so that the axis of the latter bisects the axis of pin 45. The latter is received with some clearance in the openings in the various levers so as to permit the free pivoting of the latter about their axes.

Reference numeral 53 represents a flexible circular diaphragm clamped between body portions 16 and 17 by means of bolts joining a circular flange 54 of the cap portion and flange 19. The diaphragm is provided with a central opening through which is passed a stud 55 of a clamping plate 56, the stud being threaded in a central opening of a circular clamping plate 57, the lower face of the diaphragm being in part engaged by a washer 58 which surrounds an annular shoulder of member 56 outwardly of stud 55. Member 56 has a pair of downwardly extending diametrically opposite arms or lugs 59 and 60 whose free ends are pierced to receive pivot pins 61 and 62 with which are engaged the outer ends of levers 47, 48, and 49, 50, respectively, for free pivoting movement.

Clamping plate 57 serves also as a spring seat and to this end is provided on its upper face with a series of spring centering bosses 63 which are arranged symmetrically on the marginal portion thereof. In Figure 6 ten of these bosses are shown arranged in diametrically opposed pairs, together with an inner series of symmetrically arranged bosses 64, the latter being three in number, as here shown.

Reference numeral 65 designates a circular spring seat provided on its lower face with series of bosses 66 and 67 arranged exactly as the bosses 63 and 64, the opposed bosses being engaged in the ends of outer and inner series of compression springs 68 and 69, which springs are all alike. The springs are held under compression by means of a thrust member 70 threaded axially through the top of the cap member 17 and locked by a nut 71, the inner rounded end of member 70 being engaged in a central depression 72 of member 65.

Communication between the delivery chamber 23 and the pressure chamber 18 is established by one or more ducts 73 here shown as formed between the neck 38 and valve 39, specifically in the inner wall of the neck, and terminating downwardly in an annular recess 73' in the neck.

Assuming that the regulator is intended for use in a water distribution system, that a source of water under pressure is connected into the inlet port through pipe 74, and that the outlet pipe 75 is controlled by a faucet or faucets, when the latter are closed the reduced pressure for which the device is set exists in the pressure and the delivery chambers, and valve 39 occupies the closed position shown in Figure 1. If a faucet is now opened, there occurs an immediate drop to lock-off pressure, and with the regulator in operation there are five pressure variations affecting its performance, these zones of variation being designated by the reference characters P1, P2, P3, P4, and P5, of which:

P1 is the initial pressure at the inlet side of the regulator;

P2 is the inlet pressure below the valve, this pressure being slightly less than P1 due to friction;

P3 is the greatly reduced pressure in the high velocity stream flow through the restricted seat opening (the valve being opened as shown in Figure 7 or 8);

P4 represents the recovery pressure which exists in the recovery chamber, which surrounds the seat, after the fluid passes through the restricted seat opening. The pressure begins recovery immediately after the fluid passes through the restricted valve seat opening, the percentage of recovery depending on several factors including the area of the valve seat opening, the initial pressure, the lift of the valve from its seat, the area of the surface friction to which the flow is subjected as it passes through the seat opening, and the volume of the delivery flow, and including the thickness of the stream as affected by the seat opening and construction details;

P5 represents the actual delivery pressure which is somewhat lower than P4 because of friction loss in flow from the P4 zone to the outlet;

Figure 7 is illustrative of the valve position during flow with a high pressure differential, for example, 75 pounds per square inch initial inlet pressure and 25 pounds per square outlet pressure. Due to the slight opening of the valve there is a greatly reduced pressure thereat but this is modified by a partial recovery pressure which builds up between the top of the high velocity stream and the face 41. Consequently, the pressure at the lower ends of the ducts 73 is a blend of seat flow pressure and recovered pressure, which pressure may be designated P3—4. It is this composite pressure which is communicated to the pressure chamber, the recovered component being predominant.

Figure 7a attempts to illustrate the nature of the flow and pressure conditions when valve 39 is in the position shown in Figure 7. In this figure, reference letter S designates the seat flow stream which, in this case, is relatively thin since the valve 39 is quite close to the seat. Above the seat flow stream occurs the blended pressure zone B which is relatively deep.

In the case of a low pressure differential, for example 75 pounds initial and 50 pounds outlet, the valve will open wider, as shown in Figure 8. In this situation, due to the greater thickness of the outflow, pressure at the valve opening is less reduced than in the case of a high differential. Moreover, this pressure is closer to the lower ends of ducts 73 and thus has a greater effect than in the high differential adjustment. In other words, in Figure 8 the seat pressure is the predominant component of the blended pressure communicated to the pressure chamber.

With the valve parts in the position of Figure 8, the flow is substantially as illustrated in Figure 8a. It will be seen that the seat flow stream is relatively thick while the recovered pressure stratum is correspondingly thin.

The distance between the inner end of the ducts 73, which may be considered to be at the level of surface 41, and the bed of the seat flow stream is substantially equal to the depth of the full valve opening, and in the described embodiment, never changes. The bed of the seat flow stream is the top surface of the valve seat 25.

It will be seen that when the regulator is in operation, the opening and closing movements of valve member 39 will vary the depth of the seat flow stream without varying the distance between the end of the duct and the stream bed, but that during such valve movements, the distance between the end of the duct and the top of the stream will vary inversely as the depth of the stream increases or decreases. Stated in another way, the point of termination of the duct means in the recovery chamber is nearest to the seat flow stream when the valve members 25 and 39 are farthest apart and farthest from the set flow stream when the valve members are closest together. The said point of termination is in direct contact with the seat flow stream only when the valve members are separated to their maximum extent. Under the last-mentioned situation, the blend stratum will have disappeared. However, this will occur only when the regulator is being operated on a very low pressure differential, and in such case, blended pressure control is not necessary.

It will thus be seen that the disadvantageous prior art construction including the restricted passage is overcome by the utilization of the automatically varied pressure blend at the valve under adjustment of the regulator for various differentials. At high differential the relatively small normal lift of the valve 39 gives the effect which would be secured by the prior art regulator provided with a reduced flow passage specifically designed for that differential. With the regulator adjusted for low differential, the higher lift of the valve automatically gives the effect which, in the said prior art regulator, could only be obtained by providing a differently designed flow passage. My regulator can be adjusted for any required differential with the assurance that proper compensation will be obtained at all adjustments.

The lower ends of the ducts 73 are shown as terminating downwardly in the annular recess 73'. Preferably the ducts are immediately adjacent the valve, so as to be subjected to the lowest seat pressure, but it has been found that the reduced pressure will vary at different points about the valve seat unless a recess is provided to collect and equalize the pressure all around member 39 before being transmitted to pressure chamber 18. Therefore, the function of this annular recess is to insure that a uniform low pressure is communicated through the diaphragm chamber for maintaining automatic compensation of the regulating element to adapt a single regulator to a wide range of pressure differentials. It will be seen that the valve is completely receivable in the neck and consequently the lower edge of the latter, i. e., face 41, determines the maximum flow space outwardly of the valve seat. Taking D as the diameter of the circular line of contact between the rounded valve rim 40 and the seat, I have found that, as a general rule, the distance between the top of seat 26 and face 41 should be 8.3% of D as a minimum and 10% of D as a maximum. This rule is applicable at least where the valve seat is flat, as here shown. I do not limit myself to the mentioned spacing range but give it as what I at present consider to give the best results. The bottom face of the neck is of some width and in my present view this is of importance in that the surface serves better to deflect the flow into the recovery chamber.

In Figures 9 and 10, I have shown a modified form of valve guide block. The block, designated by the numeral 80, is the same as the block 34 except that instead of having the vertical grooves 73, it has a spiral groove 81 which terminates downwardly in an annular recess 82 corresponding to the recess 73'. The spiral duct has the advantage that it enables the formation of a precise central guide for the valve member 39, whereas in broaching the vertical grooves there is always the danger of getting the bore off center.

Another important advantage of the described regulator is its elimination of water hammer. In the ordinary type of pressure regulator such, for example, as shown in the patent to J. M. Wilkins, 1,651,237 of November 29, 1927, the back surge caused by suddenly shutting off the flow at the outlet will react in all its violence directly against the diaphragm and instantly snap the valve to its closed position. Thereafter, the valve will open and close rapidly until the turbulence of the water on the delivery side of the valve subsides, and this vibratory action causes a hammering noise.

Referring to Figure 1 of the present drawings, it will be seen that the back surge cannot react instantaneously on the diaphragm 53 because the flow must pass through the restricted ducts 73 (or the restricted spiral duct 81, Figures 9 and 10) to enter the pressure chamber 18. This arrangement protects the diaphragm against the effect of water hammer in the outlet pipe. The pressure in chamber 18 can only increase gradually as the increased pressure backs up through the restricted duct or ducts and this pressure will be lowered again through the latter the instant flow is resumed through the outlet pipe. Thus it will be seen that the new regulator is automatically protected against the effect of water hammer in the outlet or delivery pipe.

Another feature which increases the sensitiveness of the regulating action of the new device is that when the pressure in the pressure chamber 18 is reduced (by equalizing through the restricted duct with the reduced blended pressure) this not only reduces the pressure against the diaphragm but also reduces the pressure on the top end of the valve member 39 which is exposed to the pressure in the pressure chamber. This, of course, increases the tendency of the valve to open, whereas, if the normal delivery pressure, which is always higher than the blended pressure, had direct access to the area of the valve member opposite the valve seat, it would work against the tendency of the loading spring to force the valve open and would also permit water hammer in the outlet pipe to force the valve closed, thus causing water hammer in the regulator even though the back surge were diverted from direct reaction against the diaphragm. When a back surge occurs, the valve 39 being open, its net effect on the lower face of the valve will be negligible under most conditions since, for one reason, the lower face of the valve is constantly subjected to the inlet pressure, and even when the pressure potential of the back surge exceeds the inlet pressure, the reaction against the lower face of the valve is minimized because the pressure must pass through the narrow space between the valve and its seat and this space is quite narrow even when the valve is fully open. It may, therefore, be said that all the areas on the low pressure side of the valve seat that can affect the operation of valve 39, including such areas of the diaphragm and valve member, are exposed in the pressure chamber to the blended pressure transmitted thereto by the duct or ducts.

In order to take advantage of the direct effect of the pressure chamber pressure on the valve, the area of the valve affected by the said pressure should be substantial. As here shown, this area is the same as that affected by the inlet pressure.

Outside of the dominating features above discussed, the new regulator has numerous valuable constructional features. I have already pointed out the advantages of the new strainer and valve seat arrangement. Another feature is the mounting of the valve in the removable block 34. In order to remove the block it is only necessary to remove the cap 17, unscrew the clamping plate 57, and remove the screws as at 37, thereby enabling the block with the valve and motion transmitting means to be lifted out. Another important feature is the provision of the multiple compression springs 68 and 69. Ten of the former are shown and I preferably use an even number on the outside and an uneven number on the inside. By this arrangement I can obtain eleven spring combinations and still maintain a balanced effect, these combinations being composed of two, three, four, five, six, seven, eight, nine, ten, eleven, and thirteen springs respectively. It will be observed that if only two springs are used, it will be necessary to dispose these two springs diametrically opposite each other in the outer row. In using three springs, they must be located in the center as shown. In general, combinations of odd numbers of springs would include three springs in the center and the others would be disposed in the outer row in balanced relation. In using combinations of even numbers, the springs would all be disposed in the outer row. With the two series of springs, pressure is applied to the diaphragm at a multiplicity of symmetrically arranged points and even should a spring break a fairly good balance will still be maintained for satisfactory operation.

In Figure 11 the valve seat nipple 25' is provided with an annular upstanding rib 40' and the movable valve member 39' is provided with a circular recess at its lower end in which is secured a gasket 26' whose marginal portion overlies the rib 40. As compared to Figure 7a, there is thus merely a reversal of parts in that the movable valve body carries the gasket and the seat is provided with the cooperating rib. The action is the same in either case and in Figure 11, the indicated flow and pressure conditions are the same as in Figure 7a. The point sought to be made is that it makes no difference under the invention whether the sealing gasket, when used, is carried by the seat or by the cooperating movable valve body.

Referring to Figure 12, the regulator comprises a housing 85 with inlet opening 86, inlet chamber 87, recovery chamber 88, pressure chamber 89, and outlet opening 90. The recovery and pressure chambers have a common wall 91 and the recovery chamber includes a wall 92 opposite wall 91. The walls are provided with aligned circular apertures 93 and 94, apertures 93 being that of a ring 91' threaded in an opening in wall 91 and forming a part of the latter.

Reference numeral 95 designates an annular valve member slidably disposed in aperture 94 and provided with an external annular groove equipped with an O-ring 96 so that a seal is provided between the valve member and the aperture wall. The valve member has a top annular groove which flushly receives a flat gasket 97. Short integral arms 98 rise from the top marginal portion of the valve member and terminate upwardly in an internally threaded ring 99, a flow space being provided between the arms and the latter being of small cross section and widely spaced so as to obstruct the flow space as little as possible.

Reference numeral 100 designates a tubular member slidable in the aperture 93 and sealing with the latter through an O-ring 101 received in an annular groove in the aperture wall. Member 100 has an externally threaded lower end engaged with ring portion 99 so that a unitary assembly is provided, the lower edge of the tubular member terminating at the lower edge of the ring. The tubular member is open to the pressure chamber through lateral perforations 102 and its upper end is formed as a threaded stud 103 which engages a clamping plate 104 which clamps a diaphragm 105 against the flat top of the tubular member. The margin of the diaphragm is clamped between housing parts 106 and 107. Plate 104 has associated therewith a number of springs and a top spring seat in the same manner as shown in Figures 1 and 6.

Reference numeral 108 designates a lug or strut fixed in inlet chamber 87 and having threaded therein a vertical stud 109 whose upper end is threaded into a solid valve body 110 which is embraced by the tubular means 100 with a sliding fit. Formed in the tubular means are grooves or ducts 111 which extend longitudinally past the valve body 110 so as to communicate the pressure blend from the recover chamber to the pressure chamber just as in the first embodiment. As in the first embodiment, fluid rising through the annular valve member, when the members are separated, is directed by the opposed faces substantially radially into the recovery chamber and at the lower ends of ducts 111 there is a blend of seat flow pressure and recovered pressure except when the valve members are at maximum separation so that the point of termination of the ducts in the recovery chamber is at the level of the lower edge of member 110. At this point, the blend disappears and the top of the seat flow stream is in contact with the lower ends of the ducts. As was stated in connection with the first embodiment, when this latter condition occurs there is only a slight pressure differential and the absence of the blended pressures is immaterial.

In the assembly of the regulator of Figure 12, stud 109 is screwed in place and annular member 95, separated from the tubular member 100, is positioned in aperture 94 and member 110 is applied, the member being provided with a top groove for engagement by a screw driver. Member 100 can now be threaded to member 95 while the latter is held against turning as by a tool inserted through the outlet between arms 98. Ring 91' can then be threaded into place, it being provided with top grooves for engagement by a spanner. The rest of the assembly follows in obvious manner.

It will be seen that the purpose of ring 91' is merely to permit the insertion of member 95 from above. The ring can be omitted and aperture 93 formed in a solid wall 91 if strut 108 is made removable, by securing it in place by means of screws threaded into it through the housing walls, so that member 95 can be inserted from below.

The embodiments of the invention which have been described are to be regarded as typical since variations in the form and arrangement of parts beyond those herein disclosed are contemplated under the invention as defined in the following claims.

I claim:

1. A fluid pressure regulator comprising means including a movable wall defining a pressure chamber, regulable means yieldingly urging said wall toward said chamber, means defining a recovery chamber having an inlet and an outlet port, an annular valve seat on the outlet side of said inlet port, a valve in said recovery chamber cooperable with said seat, tubular means guiding said valve for reciprocation coaxially with said seat, means connecting said wall and valve and acting to move said valve away from said seat upon movement of said wall toward said pressure chamber, and a duct arranged to communicate to the pressure chamber the reduced pressure resulting from flow past the variably opened valve as a correspondingly varied blend with the recovered pressure in said recovery chamber, said tubular means having an annular end face unobstructed by the valve positioned to deflect the flow outwardly of the valve, said duct being formed between said valve and said tubular means and terminating in the recovery chamber at said annular face.

2. A fluid pressure regulator comprising means including a movable wall defining a pressure chamber, regulable means yieldingly urging said wall toward said chamber, means defining a recovery chamber having an inlet and an outlet port, an annular valve seat on the outlet side of said inlet port, a valve in said recovery chamber cooperable with said seat, tubular means guiding said valve for reciprocation coaxially with said seat, means connecting said wall and valve and acting to move said valve away from said seat upon movement of said wall toward said pressure chamber, and a duct arranged to communicate to the pressure chamber the reduced pressure resulting from flow past the variably opened valve as a correspondingly varied blend with the recovered pressure in said recovery chamber, said tubular means having an annular end face unobstructed by the valve positioned to deflect the flow outwardly of the valve, said duct being formed in said tubular means and terminating in the recovery chamber at said annular face.

3. A fluid pressure regulator comprising means including a movable wall defining a pressure chamber, regulable means yieldingly urging said wall toward said chamber, means defining a recovery chamber having an inlet and an outlet port, an annular valve seat on the outlet side of said inlet port, a valve in said recovery chamber cooperable with said seat, tubular means guiding said valve for reciprocation coaxially with said seat, means connecting said wall and valve and acting to move said valve away from said seat upon movement of said wall toward said pressure chamber, and a duct arranged to communicate to the pressure chamber the reduced pressure resulting from flow past the variably opened valve as a correspondingly varied blend with the recovered pressure in said recovery chamber, said tubular means having an end edge adjacent said seat and directly determining the maximum flow space outwardly of said seat, said duct terminating in the recovery chamber at said end edge.

4. A fluid pressure regulator comprising means including a movable wall defining a pressure chamber, regulable means yieldingly urging said wall toward said chamber, means defining a recovery chamber having an inlet and an outlet port, an annular valve seat on the outlet side of said inlet port, a valve in said recovery chamber cooperable with said seat, tubular means guiding said valve for reciprocation coaxially with said seat, means connecting said wall and valve and acting to move said valve away from said seat upon movement of said wall toward said pressure chamber, and a duct arranged to communicate to the pressure chamber the reduced pressure resulting from flow past the variably opened valve as a correspondingly varied blend with the recovered pressure in said recovery chamber, said tubular means having an end edge adjacent said seat and directly determining the maximum flow space outwardly of said seat, said duct terminating in the recovery chamber at said end edge and directly adjacent said valve.

5. A fluid pressure regulator comprising a body having a pressure chamber therein, a movable wall closing one side of said chamber, regulable means yieldingly urging said wall toward said chamber, a fixed wall closing the opposite side of said chamber, a passage through said body from an inlet to an outlet port and including a recovery chamber on the opposite side of said fixed wall from the pressure chamber and including a port to the recovery chamber opposite said fixed wall, an annular valve seat in the recovery chamber surrounding the last-mentioned port, a neck projecting into said recovery chamber from said fixed wall coaxially with said seat, a reciprocable valve guided in said neck for cooperation with said seat, means connecting said movable wall and said valve and acting to move said valve away from said seat upon movement of said movable wall toward said pressure chamber, said neck having an end face adjacent said seat unobstructed by said valve and directly determining the maximum flow space outwardly of the seat, and a duct arranged to communicate to the pressure chamber the reduced pressure resulting from flow past the variably opened valve as a correspondingly varied blend with the recovered pressure in said recovery chamber, said duct terminating in the recovery chamber at said face.

6. A fluid pressure regulator comprising a body having a pressure chamber therein, a movable wall closing one side of said chamber, regulable means yieldingly urging said wall toward said chamber, a fixed wall closing the opposite side of said chamber, a passage through said body from an inlet to an outlet port and including a recovery chamber on the opposite side of said fixed wall from the pressure chamber and including a port to the recovery chamber opposite said fixed wall, an annular valve seat in the recovery chamber surrounding the last-mentioned port, a neck projecting into said recovery chamber from said fixed wall coaxially with said seat, a reciprocable valve guided in said neck for cooperation with said seat, means connecting said movable wall and said valve and acting to move said valve away from said seat upon movement of said movable wall toward said pressure chamber, said neck having an end face adjacent said seat unobstructed by said valve and directly determining the maximum flow space outwardly of the seat, and a duct arranged to communicate to the pressure chamber the reduced pressure resulting from flow past the variably opened valve as a correspondingly varied blend with the recovered pressure in said recovery chamber, said duct terminating in the recovery chamber at said face and being formed between said neck and valve.

7. In a fluid pressure regulator a body portion having an inlet chamber and an outlet chamber and a partition between said chambers, a nipple threaded in an aperture of said partition and constituting a valve seat, said inlet chamber having a wall portion provided with an opening opposite said nipple through which the latter is insertable and removable, said inlet chamber having an inlet opening opposite said wall opening, removable closure means for said wall opening, and a tubular strainer of a size to be passed through said wall opening supported at one end by said closure means in the inlet chamber with its other end peripherally engaged in said inlet opening to receive the entire flow therefrom.

8. In a fluid pressure regulator, a body portion having an inlet chamber and an outlet chamber and a partition between said chambers, an inlet port for the inlet chamber and an outlet port for the outlet chamber, said ports being in general alignment, a nipple threaded in an aperture of said partition on an axis transverse with respect to the line of said ports and constituting a valve seat, said inlet chamber having a wall provided with an opening opposite said nipple and faced toward said inlet port, said nipple being insertable and removable through said opening, a closure means for said opening, and a tubular strainer insertable and removable through said opening, one end of said strainer being peripherally engaged in said inlet port to receive the entire flow therefrom and the other end of said strainer being engaged in a socket in said closure means so as to be removable with the latter.

9. In a fluid pressure regulator, a body having a pressure chamber and an outlet chamber and a fixed wall between said chambers, a movable and removable wall closing the pressure chamber opposite said fixed wall, means yieldingly urging said movable wall inwardly toward said fixed wall, an opening in said fixed wall, an annular valve seat opposite said opening around an inlet to the outlet chamber, a block removably secured to said fixed wall in the pressure chamber and having a neck projecting into said outlet chamber coaxially with said seat and having an annular end face adjacent said seat and parallel thereto, a valve slidable in said neck for cooperation with said seat, means carried by said block and in connection with said movable wall for transmitting inward movement of the latter to said valve in the opening sense, and a duct connecting said chambers and terminating in the outlet chamber at said face and closely adjacent the side of the valve, said valve being movable away from said seat to a position completely within said bore.

10. Structure according to claim 9, wherein the duct is formed between the valve and neck.

11. A fluid pressure regulator comprising means including a movable wall defining a pressure chamber, regulable means yieldingly urging said wall toward said chamber, means defining a recovery chamber having an inlet and an outlet port, an annular valve seat on the outlet side of said inlet port, a valve in said recovery chamber cooperable with said seat, tubular means guiding said valve for reciprocation coaxially with said seat, means connecting said wall and valve and acting to move said valve away from said seat upon movement of said wall toward said pressure chamber, and a duct arranged to communicate to the pressure chamber the reduced pressure resulting from flow past the variably opened valve as a correspondingly varied blend with the recovered pressure in said recovery chamber, said tubular means having an annular end face unobstructed by the valve positioned to deflect the flow outwardly of the valve, said end face having an annular recess therein adjacent said valve and said duct terminating in the recovery chamber in said recess.

12. A fluid pressure regulator comprising means including a movable wall defining a pressure chamber, regulable means yieldingly urging said wall toward said chamber, means defining a recovery chamber having an inlet and an outlet port, an annular valve seat on the outlet side of said inlet port, a valve in said recovery chamber cooperable with said seat, tubular means guiding said valve for reciprocation coaxially with said seat, means connecting said wall and valve and acting to move said valve away from said seat upon movement of said wall toward said pressure chamber, and a spiral duct formed between said tubular means and valve to communicate to the pressure chamber the reduced pressure resulting from flow past the variably opened valve as a correspondingly varied blend with the recovered pressure in said recovery chamber, said tubular means having an annular end face unobstructed by the valve positioned to deflect the flow outwardly of the valve.

13. A fluid pressure regulator comprising means including a movable wall defining a pressure chamber, regulable means yieldingly urging said wall toward said chamber, means defining a recovery chamber having an inlet and an outlet port, an annular valve seat on the outlet side of said inlet port, a valve in said recovery cooperable with said seat, tubular means guiding said valve for reciprocation coaxially with said seat, means connecting said wall and valve and acting to move said valve away from said seat upon movement of said wall toward said pressure chamber, and a spiral duct formed between said tubular means and valve to communicate to the pressure chamber the reduced pressure resulting from flow past the variably opened valve as a correspondingly varied blend with the recovered pressure in said recovery chamber, said tubular means having an annular end face unobstructed by the valve positioned to deflect the flow outwardly of the valve, said end face having an annular recess therein adjacent said valve and said duct terminating in the recovery chamber in said recess.

14. A fluid pressure regulator comprising means including a movable wall defining a pressure chamber, regulable means yieldingly urging said wall toward said chamber, means defining a recovery chamber having an inlet and an outlet port, a flat annular valve seat on the outlet side of said inlet port, a valve in said recovery chamber cooperable with said seat, tubular means guiding said valve for reciprocation coaxially with said seat, means connecting said wall and valve and acting to move said valve away from said seat upon movement of said wall toward said pressure chamber, and a duct arranged to communicate to the pressure chamber the reduced pressure resulting from flow past the variably opened valve as a correspondingly varied blend with the recovered pressure in said recovery chamber, said tubular means having an annular end face unobstructed by the valve positioned closely adjacent to said seat to deflect the flow outwardly of the valve, said duct being formed between said valve and said tubular means and terminating in said recovery chamber substantially at said annular face, said valve having a circular line of contact with said seat and the distance between said seat and face being about 8.3% to 10% of the diameter of said circular line.

15. In a fluid pressure regulator, a body having a pressure chamber and an outlet chamber and a fixed wall between said chambers, a movable and removable wall closing the pressure chamber opposite said fixed wall, means yieldingly urging said movable wall inwardly toward said fixed wall, an opening in said fixed wall, an annular valve seat opposite said opening around an inlet to the outlet chamber, a block removably secured to said fixed wall in the pressure chamber and having a bore coaxial with said seat, a valve slidable in said bore for cooperation with said seat, means carried by said block and in connection with said movable wall for transmitting inward movement of the latter to said valve in the opening sense, and a duct formed in said block and connecting said chambers.

16. In a fluid pressure regulator, a body having a pressure chamber and an outlet chamber and a fixed wall between said chambers, a movable and removable wall closing the pressure chamber opposite said fixed wall, means yieldingly urging said movable wall inwardly toward said fixed wall, an opening in said fixed wall, an annular valve seat opposite said opening around an inlet to the outlet chamber, a block removably secured to said fixed wall in the pressure chamber and having a bore coaxial with said seat, a valve slidable in said bore for cooperation with said seat, means carried by said block and in connection with said movable wall for transmitting inward movement of the latter to said valve in the opening sense, and a duct formed between the valve and block and connecting said chambers.

17. In a fluid pressure regulator, a body having a pressure chamber and an outlet chamber and a fixed wall between said chambers, a movable and removable wall closing the pressure chamber opposite said fixed wall, means yieldingly urging said movable wall inwardly toward said fixed wall, an opening in said fixed wall, an annular valve seat opposite said opening around an inlet to the outlet chamber, a block removably secured to said fixed wall in the pressure chamber and having a bore coaxial with said seat, said block having an extension in the outlet chamber projecting into adjacency with said seat and in which said bore is formed, a valve slidable in said bore for cooperation with said seat, means carried by said block and in connection with said movable wall for transmitting inward movement of the latter to said valve in the opening sense, and a duct connecting said chambers.

18. In a fluid pressure regulator, a body having a pressure chamber and an outlet chamber and a fixed wall between said chambers, a movable and removable wall closing the pressure chamber opposite said fixed wall, means yieldingly urging said movable wall inwardly toward said fixed wall, an opening in said fixed wall, an annular valve seat opposite said opening around an inlet to the outlet chamber, a block removably secured to said fixed wall in the pressure chamber and having a bore coaxial with said seat, said block having an extension in the outlet chamber projecting into adjacency with said seat and in which said bore is formed, a valve slidable in said bore for cooperation with said seat, said valve being movable away from said seat to a position completely within said bore, means carried by said block and in connection with said movable wall for transmitting inward movement of the latter to said valve in the opening sense, and a duct connecting said chambers.

19. In a fluid pressure regulator, a body having a pressure chamber and an outlet chamber and a fixed wall between said chambers, a movable and removable wall closing the pressure chamber opposite said fixed wall, means yieldingly urging said movable wall inwardly toward said fixed wall, an opening in said fixed wall, an annular valve seat opposite said opening around an inlet to the outlet chamber, a block removably secured to said fixed wall in the pressure chamber and having a bore coaxial with said seat, a valve slidable in said bore for cooperation with said seat, means carried by said block and in connection with said movable wall for transmitting inward movement of the latter to said valve in the opening sense, and a duct connecting said chambers, said block having an extension in the outlet chamber projecting into adjacency with said seat and in which said bore is formed and said duct terminating in the outlet chamber at the end of said extension and closely adjacent the side of said valve.

20. In a fluid pressure regulator, a body having a pressure chamber and an outlet chamber and a fixed wall between said chambers, a movable and removable wall closing the pressure chamber opposite said fixed wall, means yieldingly urging said movable wall inwardly toward said fixed wall, an opening in said fixed wall, an annular valve seat opposite said opening around an inlet to the outlet chamber, a block removably secured to said fixed wall in the pressure chamber and having a bore coaxial with said seat, said block having an extension in the outlet chamber projecting into adjacency with said seat and in which said bore is formed, a valve slidable in said bore for cooperation with said seat, said valve being movable way from said seat to a position completely within said bore, means carried by said block and in connection with said movable wall for transmitting inward movement of the latter to said valve in the opening sense, and a duct connecting said chambers, said duct terminating in the outlet chamber at the end of said extension and closely adjacent the side of said valve.

21. In a fluid pressure regulator, a body comprising a part having a pressure chamber therein, a circular diaphragm closing one side of said chamber, a cap member between which and said body part the diaphragm margin is clamped, a circular spring seat coaxially secured to said diaphragm in said cap member, a second circular spring seat in said cap member spaced from and coaxial with the first, a series of compression springs between said seats symmetrically arranged about the axis thereof, said springs being disposed at the seat margins closely adjacent each other in diametrically opposed pairs, bosses on said seats maintaining the spring arrangement, and adjustable thrust means between said cap member and said second seat.

22. In a fluid pressure regulator, a body comprising a part having a pressure chamber therein, a circular diaphragm closing one side of said chamber, a cap member between which and said body part the diaphragm margin is clamped, a circular spring seat coaxially secured to said diaphragm in said cap member, a second circular spring seat in said cap member spaced from and coaxial with the first, a series of compression springs between said seats symmetrically arranged about the axis thereof, said springs being disposed at the seat margins closely adjacent each other in diametrically opposed pairs, another symmetrical series of compression springs arranged within the first series, bosses on said seats maintaining the spring arrangement, and adjustable thrust means between said cap member and said second seat.

23. In a fluid pressure regulator, a body comprising a part having a pressure chamber therein, a circular diaphragm closing one side of said chamber, a cap member between which and said body part the diaphragm margin is clamped, a circular spring seat coaxially secured to said diaphragm in said cap member, a second circular spring seat in said cap member spaced from and coaxial with the first, a series of compression springs between said seats symmetrically arranged about the axis thereof, said springs being of an even number and disposed at the seat margins closely adjacent each other, a symmetrical series of three compression springs arranged within the first series, bosses on said seats maintaining the spring arrangement, and adjustable thrust means between said cap member and said second seat.

24. A fluid pressure regulator comprising a housing having an inlet opening and an outlet opening, means including a wall between said openings defining a recovery chamber in communication with said outlet opening, valve means including an annular member and a cooperating body member, one of said members constituting a seat for the other, said annular member being disposed in and sealing with an opening in said wall and providing a flow port from the housing inlet to said recovery chamber, one of said members being fixed and the other being movable toward and away therefrom, means including a movable wall defining a pressure chamber, regulable means yieldingly urging said movable wall inwardly of said pressure chamber, means connecting said movable wall and said movable member and acting to move said movable member away from said fixed member upon movement of said movable wall inwardly of said pressure chamber, and a duct arranged to communicate to the pressure chamber the reduced pressure resulting from flow past the variably separated valve members as a correspondingly varied blend with the recovered pressure in said recovery chamber, said duct having a point of termination in the recovery chamber which is nearest to the seat flow stream when said members are farthest apart and farthest from said stream when said members are closest together, said point of termination being directly contacted by said stream only when said members are at maximum separation.

25. A regulator according to claim 24 wherein said annular member is fixed in said wall opening and said body member is the movable member.

26. A regulator according to claim 24 wherein said annular member is movable in said wall opening and said body member is the fixed member.

27. A fluid pressure regulator comprising a housing having an inlet opening and an outlet opening, means including a wall between said openings defining a recovery chamber in communication with said outlet opening, valve means including an annular member and a cooperating body member, one of said members constituting a seat for the other, said annular member being disposed in and sealing with an opening in said wall and providing a flow port from the housing inlet to said recovery chamber, one of said members being fixed and the other being movable toward and away therefrom, means including a movable wall defining a pressure chamber, regulable means yieldingly urging said movable wall inwardly of said pressure chamber, means connecting said movable wall and said movable member and acting to move said movable member away from said fixed member upon movement of said movable wall inwardly of said pressure chamber, one of said members overlying the other and the opposed faces of said members being shaped so that when they are separated flow through said annular member is directed between said faces to the recovery chamber as a substantially radial seat flow stream, and a duct connecting the recovery chamber and pressure chamber, the end of the duct in said recovery chamber being disposed so that it is out of direct contact with said stream except at maximum separation of said faces.

28. A regulator according to claim 27 wherein said annular member is fixed in said wall opening and said body member is the movable member.

29. A regulator according to claim 27 wherein said annular member is movable in said wall opening and said body member is the fixed member.

30. A fluid pressure regulator comprising a housing having an inlet opening and an outlet opening, means including a wall between said openings defining a recovery chamber in communication with said outlet openings, valve means including an annular member and a cooperating body member, one of said members constituting a seat for the other, said annular member being disposed in and sealing with an opening in said wall and providing a flow port from the housing inlet to said recovery chamber, one of said members being fixed and the other being movable toward and away therefrom, means including a movable wall defining a pressure chamber, regulable means yieldingly urging said movable wall inwardly of said pressure chamber, means connecting said movable wall and said movable member and acting to move said movable member away from said fixed member upon movement of said movable wall inwardly of said pressure chamber, tubular means open to the pressure chamber extending from the pressure chamber into the recovery chamber in alignment with said annular member and embracing said body member with a sliding fit, the end of said tubular means in the recovery chamber being spaced from said annular member and determining the maximum depth of seat flow stream, and a duct in said tubular means extending longitudinally past said other member for communicating to the pressure chamber a blend of the seat flow pressure and the recovered pressure.

31. A regulator according to claim 24 wherein said tubular means and annular member are fixed, and said body member is the movable member.

32. A regulator according to claim 24 wherein said tubular means and annular member constitute an axially slidable unit, and said body member is the fixed member.

33. A fluid pressure regulator comprising a housing having an inlet opening and an outlet opening, a pressure chamber and a recovery chamber in said housing having a common wall and the recovery chamber having a wall opposite said common wall, said recovery chamber communicating with the outlet opening, opposed apertures in said walls, an annular valve member disposed in and sealing with the aperture in said opposite wall and slidable therein, said annular member providing a flow port between the housing inlet and the recovery chamber, tubular means open to the pressure chamber slidable in and sealing with the aperture in said common wall, said pressure chamber including a pressure responsive wall, means for transmitting movements of said pressure responsive wall to said tubular means, means securing said tubular means and annular valve member together with a flow space between them, a fixed valve member embraced by said tubular means with a sliding fit and cooperable with said annular valve member as a seat, and a duct in said tubular means extending longitudinally past said fixed valve member for communicating to the pressure chamber a blend of the seat flow pressure and the recovered pressure.

34. A fluid pressure regulator comprising means including a movable wall defining a pressure chamber, regulable means yieldingly urging said wall toward said chamber, means defining a recovery chamber having an inlet and an outlet port, an annular valve seat on the outlet side of said inlet port, a valve member having its seating end in said recovery chamber and cooperable with said seat and its other end in said pressure chamber, means connecting said wall and valve member and acting to move said valve member away from said seat upon movement of said wall toward said pressure chamber, a duct arranged to communicate to said pressure chamber the reduced pressure resulting from flow past the variably opened valve as a correspondingly varied blend with the recovered pressure in said recovery chamber, all the areas on the low pressure side of said valve seat that can affect the operation of said valve member, including such areas of said movable wall and valve member, being exposed in said pressure chamber to the blended pressure transmitted by said duct to said pressure chamber.

35. A fluid pressure regulator comprising a housing, a pressure chamber and a recovery chamber in said housing, the housing including a wall separating said chambers, another wall of said pressure chamber being movable, regulable means yieldingly urging said movable wall inwardly of said chamber, said recovery chamber having a wall opposite said separating wall provided with an inlet port, an annular valve seat surrounding said port in the recovery chamber, a bore in said separating wall aligned with said port, a valve slidable in said bore cooperable at one end with said seat and with its other end subject to the pressure in the pressure chamber, means connecting said movable wall and valve and acting to move said valve away from said seat upon movement of said movable wall inwardly of the pressure chamber, and a duct arranged to communicate to the pressure chamber the reduced pressure resulting from flow past the variably opened valve as a correspondingly varied blend with the recovered pressure in the recovery chamber, all of the areas of said valve member on the low pressure side of said valve seat that can affect the operation of said valve member being exposed in said pressure chamber to the blended pressure transmitted by said duct to said pressure chamber, the area of the valve affected by pressure in the pressure chamber being of the order of that exposed to the inlet pressure.

36. A fluid pressure regulator comprising a housing having an inlet opening and an outlet opening, means including a wall between said openings defining a recovery chamber in communication with said outlet opening, valve means including an annular member and a cooperating body member, one of said members constituting a seat for the other, said annular member being disposed in and sealing with an opening in said wall and providing a flow port from the housing inlet to said recovery chamber, one of said members being fixed and the other being movable toward and away therefrom, means including a movable wall defining a pressure chamber, regulable means yieldingly urging said movable wall inwardly of said pressure chamber, means connecting said movable wall and said movable member and acting to move said movable member away from said fixed member upon movement of said movable wall inwardly of said pressure chamber, and a duct for supplying control pressure to said pressure chamber, said duct having a point of termination in said recovery chamber adjacent the base of the flow stream emerging from between said valve members and spaced from said annular member in the direction of said body member a distance of the order of the maximum separation between said members.

37. A fluid pressure regulator comprising a housing having an inlet opening and an outlet opening, means including a wall between said openings defining a recovery chamber in communication with said outlet opening, valve means including an annular member and a cooperating body member, one of said members constituting a seat for the other, said annular member being disposed in and sealing with an opening in said wall and providing a flow port from the housing inlet to said recovery chamber, one of said members being fixed and the other being movable toward and away therefrom, means including a movable wall defining a pressure chamber, regulable means yieldingly urging said movable wall inwardly of said pressure chamber, means connecting said movable wall and said movable member and acting to move said movable member away from said fixed member upon movement of said movable wall inwardly of said pressure chamber, and a duct for supplying control pressure to said pressure chamber, said duct having a point of termination in said recovery chamber immediately alongside said body member and spaced from said annular member a distance of the order of the maximum separation between said members.

FRANK H. MUELLER.

REFERENCES CITED

The following references are of record in the file of this patent:

UNITED STATES PATENTS

| Number | Name | Date |
| --- | --- | --- |
| 1,515,911 | Terry | Nov. 18, 1924 |
| 1,605,399 | Fornaca | Nov. 2, 1926 |
| 1,931,777 | Thrall | Oct. 24, 1933 |
| 2,070,660 | Hughes | Feb. 16, 1937 |
| 2,237,940 | Koenig | Apr. 8, 1941 |